United States Patent
Fleming et al.

(10) Patent No.: US 6,480,633 B1
(45) Date of Patent: Nov. 12, 2002

(54) ELECTRO-OPTIC DEVICE INCLUDING A BUFFER LAYER OF TRANSPARENT CONDUCTIVE MATERIAL

(75) Inventors: Robert McLemore Fleming, Chatham, NJ (US); Rafael Nathan Kleiman, New York, NY (US); Jueinai Raynien Kwo, Watchung, NJ (US); John William Osenbach, Kutztown, PA (US); Gordon Albert Thomas, Princeton, NJ (US)

(73) Assignee: Agere Systems Inc., Orlando, FL (US)

( * ) Notice: Subject to any disclaimer, the term of this patent is extended or adjusted under 35 U.S.C. 154(b) by 0 days.

(21) Appl. No.: 09/335,125

(22) Filed: Jun. 17, 1999

(51) Int. Cl.[7] ............................... G02F 1/035
(52) U.S. Cl. ............................... 385/2; 385/8
(58) Field of Search ................. 385/1, 2, 4, 8

(56) References Cited

U.S. PATENT DOCUMENTS

| | | | | |
|---|---|---|---|---|
| 5,407,602 A | * | 4/1995 | Cava | 255/518 |
| 5,538,767 A | * | 7/1996 | Cava et al. | 427/596 |
| 5,566,258 A | * | 10/1996 | Hatori et al. | 385/8 |
| 5,617,493 A | * | 4/1997 | Nishimoto | 385/40 |
| 5,628,933 A | * | 5/1997 | Carter et al. | 252/518 |
| 5,661,830 A | * | 8/1997 | Nishimoto | 385/40 |
| 5,680,497 A | * | 10/1997 | Seino et al. | 385/129 |
| 6,069,729 A | * | 5/2000 | Gill et al. | 359/245 |

* cited by examiner

Primary Examiner—John D. Lee
Assistant Examiner—Sarah U Song
(74) Attorney, Agent, or Firm—Lowenstein Sandler PC

(57) ABSTRACT

An electro-optic device comprising an electro-optic crystal substrate, an optical waveguide path in the crystal adjacent the substrate surface and an electrode spaced from the surface by a buffer layer is provided with enhanced operating stability by forming the buffer layer of a transparent electronically conductive material. Preferred buffer materials are electronically conductive gallium-indium-oxide and electronically conductive zinc-indium-tin-oxide.

1 Claim, 2 Drawing Sheets

ELECTRO-OPTIC DEVICE INCLUDING A BUFFER LAYER OF TRANSPARENT CONDUCTIVE MATERIAL

FIELD OF THE INVENTION

This invention relates to devices for optical communication systems and, in particular, to an improved electro-optic device including a buffer layer of transparent conductive material.

BACKGROUND OF THE INVENTION

Electro-optic devices are critical components of optical communication systems. By electrically changing the refractive index of material in an optical pathway, they can switch, attenuate or modulate an optical signal.

A commonly used electro-optic device uses an electrical field to control a waveguide path at the surface of an electro-optic crystal such as lithium niobate or lithium tantalate. The waveguide path is formed by locally doping the crystal to increase the refractive index. The electrical field applied to the waveguide region can further vary the refractive index in the path. The electrode for applying the field is typically separated from the crystal by a dielectric buffer layer to prevent absorption of guided light by the electrode metal.

FIG. 1 illustrates a conventional electro-optic modulator comprising an electro-optic crystal substrate 1 including, at the surface, an optical waveguide path 2 having a greater refractive index than the surrounding crystal. A signal electrode 4 and a ground electrode 5 are provided for controlling the electrical field in the region of waveguide path 2, and an optically transparent dielectric blanket layer 3 having a refractive index smaller than the waveguide is disposed between the waveguide 2 and the electrodes to prevent absorption of guided light by the electrode metal. A traveling wave electrode and signal source 6 are connected by a coaxial cable 7. Similarly a terminal resister 8 is connected by the coaxial cable 7. Crystal blocks 9 are bonded to the end surfaces of the waveguide path 2, and the path is connected to optical fiber segments 11 by fiber-fixing jigs 10.

FIG. 2 shows a cross section of the FIG. 1 device along the line A–Á. In typical modulators, the electro-optic crystal substrate 1 is lithium niobate ($LiNbO_3$) cut so that an X axis of the crystal extends in a longitudinal direction, and a Z axis extends in the direction of thickness. Alternatively, the electro-optic material can be $LiTaO_3$, $BaTiO_3$, $PbTiO_3$, $K_2Li_2Nb_5O_{15}$ or $CaNb_2O_7$. The waveguide path 2 is formed in the crystal by doping with titanium (Ti) and configured in two arms as a Mach-Zehnder interferometer. The electrodes are gold (Au) and the buffer layer is $SiO_2$. This and similar modulators and their fabrication are described in greater detail in U.S. Pat. No. 5,680,497 issued to M. Seino et al. on Oct. 12, 1997, which is incorporated herein by reference.

A difficulty with conventional electro-optic devices such as the above described modulators is that charge can build up at the interface between the dielectric layer and the crystal substrate. Lithium niobate, for example, is pyroelectric. Upon temperature cycling, this pyroelectricity can lead to a charge buildup at the interface which shifts the electric field required to produce a particular optical response. Such charge buildup deteriorates device performance.

Efforts have been made to reduce charge build up by doping the $SiO_2$ buffer oxide layer to provide weak charge transport via deep traps or ion migration. A problem with a doped $SiO_2$ buffer layer is that the conductivity of the layer varies with time due to either the filling and emptying of traps or to the motion of ions. This time dependence leads to changes in device performance over time and temperature. A second problem relates to the diffusion of Li ions into the $SiO_2$ buffer layer from the substrate. These ions can move in an electric field and if free carriers do not screen the ions, the ions can affect the electric field seen at the waveguide and degrade device performance. Accordingly, there is a need for improved electro-optic devices having enhanced operating stability

SUMMARY OF THE INVENTION

In accordance with the invention, an electro-optic device comprising an electro-optic crystal substrate, an optical waveguide path in the crystal adjacent the substrate surface and an electrode spaced from the surface by a buffer layer is provided with enhanced operating stability by forming the buffer layer of a transparent electronically conductive material. Preferred buffer materials are electronically conductive gallium-indium-oxide and electronically conductive zinc-induim-tin-oxide.

BRIEF DESCRIPTION OF THE DRAWINGS

The nature, advantages and various additional features of the invention will appear more fully upon consideration of the illustrative embodiments now to be described in detail in connection with the accompanying drawings. In the drawings.

It is to be understood that these drawings are for purposes of illustrating the concepts of the invention and are not to scale.

DETAILED DESCRIPTION

Figure 1:
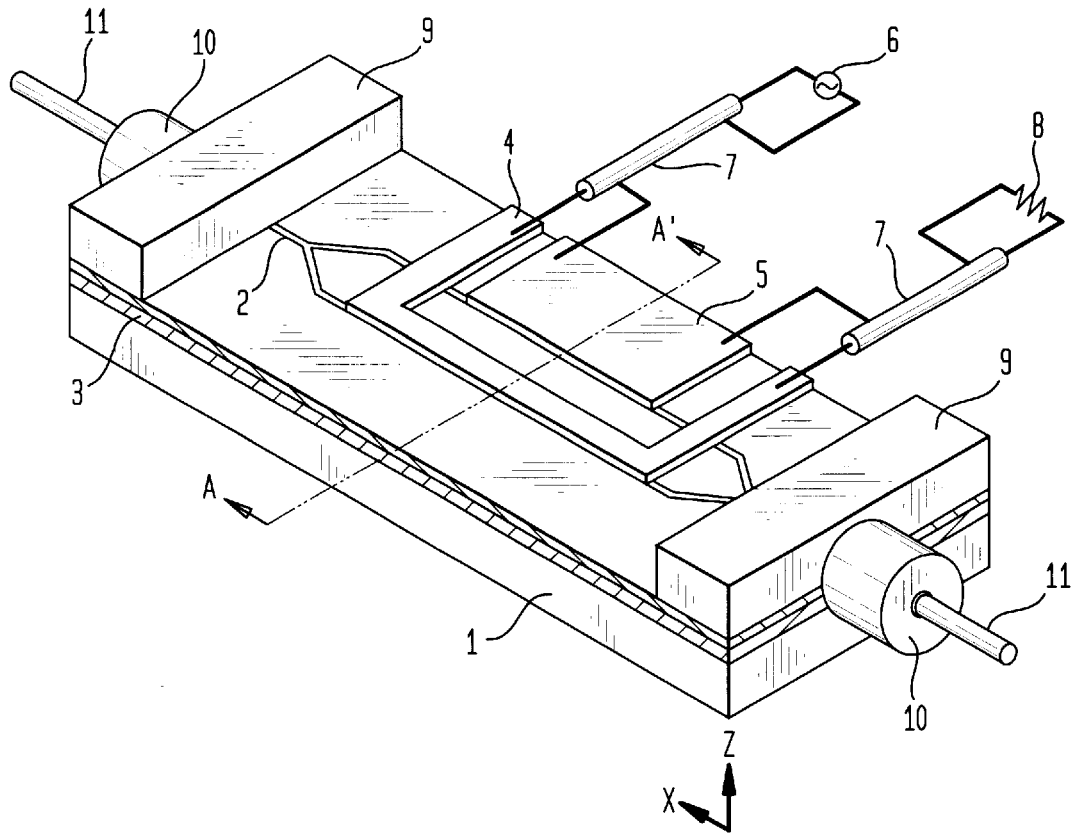
FIG. 1 is a perspective view of a conventional electro-optic device.
Figure 2:
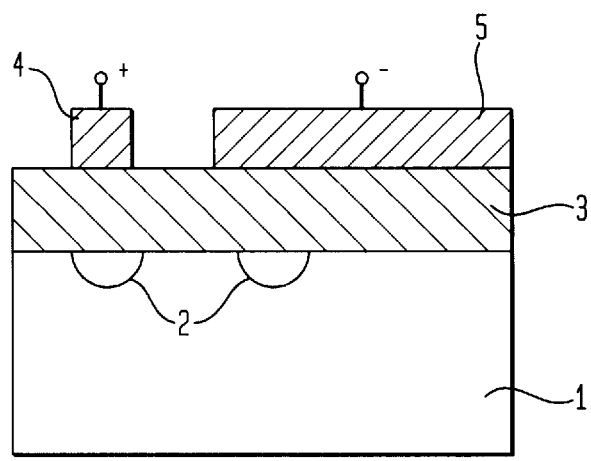
FIG. 2 is a cross section of the FIG. 1 device along the line A–Á.

Referring to the drawings, FIGS. 1 and 2, which typify conventional electro-optic devices, have been described in the Background of the Invention.

Figure 3:
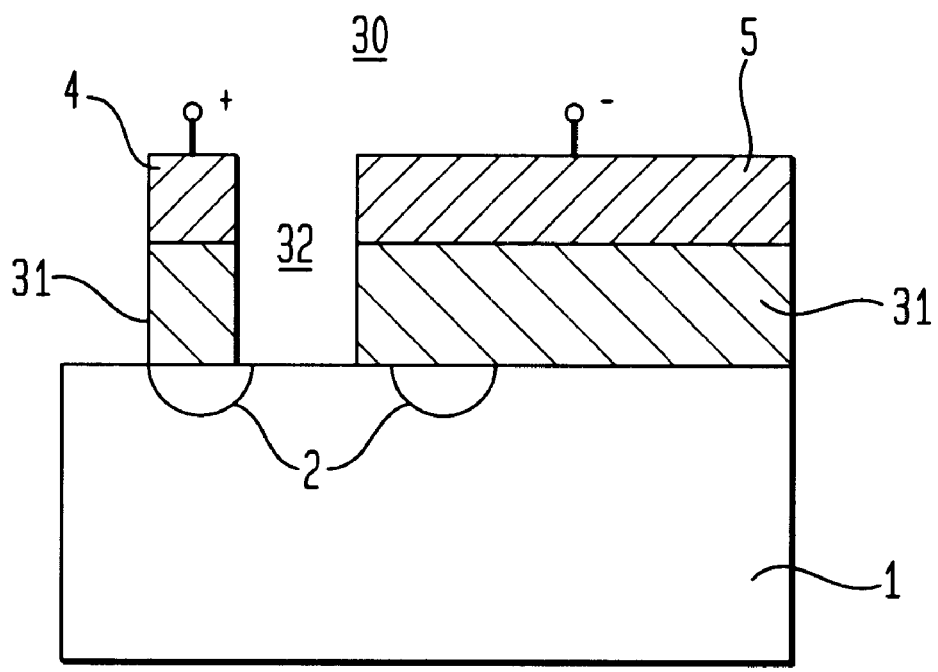
FIG. 3 is a corresponding cross section of an improved electro-optic device in accordance with the invention.

FIG. 3, which is a cross section of a device similar to FIG. 2, illustrates an improved electro-optic device 30 in accordance with the invention. The improved device is similar to a conventional electro-optic device except that the transparent dielectric buffer layer 3 of the conventional device is replaced by a transparent electronically conductive buffer layer 31 which transports charge via conduction electrons. The transparent conductive material has a lower refractive index (at the operating wavelength) than the crystal to confine the light in the crystal (typically 2.17 or less for use with $LiNbO_3$ crystal). It also has a low optical absorption at the operating wavelength (typically less than 2.5 dB/cm). It should have an electronic conductivity (typically $\geq 10^{-9}$ (ohm-cm$^{-1}$)) in excess of trap or ionic conductivity to prevent charge accumulation. Preferred materials for buffer layer 31 are electronically conductive gallium-indium-oxide and electronically conductive zinc-indium-tin-oxide. Advantageously the electrodes 4,5 are gold, but the buffer layer 31 is patterned to conform with the electrodes, i.e. etched away in the region 32 between electrodes. The electrodes and the buffer layer can be patterned in the same photolithographic step. The device can operate as an optical modulator, attenuator or switch.

The formulation and deposition of transparent electronically conductive gallium-induim-oxide are described in detail in U.S. Pat. No. 5,407,602 issued to Robert J. Cava on Apr. 18, 1995 and entitled "Transparent Conductors Comprising Gallium-Indium-Oxide". The '602 patent is incorporated herein by reference. The preferred composition is $GaInO_3$ doped with Ge, Sn or oxygen vacancies (typically 0.1 atomic % doping). The material has a bandgap of about 3.3 eV and a refractive index of about 1.65. It is transparent to light at 1.55 microns, has a sufficiently low refractive index to keep light from the absorbing electrode material and conductivity $\geq 10^{-13}(ohm\text{-}CM)^{-1}$ to prevent charge accumulation at the interface. The preferred thickness is sufficient to prevent light from being sufficiently absorbed by the electrode (typically about 1 micrometer). The deposited film can be etched by HCl.

Alternatively, the buffer layer 31 can be electronically conductive zinc-indium-tin-oxide. The formulation and deposition of such films are described in detail in U.S. Pat. No. 5,628,933 issued to Sue Carter et al. on May 13, 1997 and entitled "Transparent Conductors Comprising Zinc-Indium-Oxide and Methods for Making Same", which is incorporated herein by reference. The preferred composition is $Zn(In,Sn)_2O_4$. The material has a bandgap of about 3.2 eV and a refractive index of about 1.85. It is transparent to light at 1.55 microns, has a sufficiently low refractive index to keep light from the absorbing electrode material and sufficient conductivity to prevent charge accumulation at the interface.

As compared with prior art devices using doped $SiO_2$ buffer layers, the improved electro-optic devices eliminate time dependence of the conductivity because the charge transport is electronic from a partially filled electronic band rather than charge transport from traps or ions in a dielectric. And because the transparent conductors are highly conducting as compared to $SiO_2$, they can screen uncompensated ions such as Li ions.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed is:

1. In the electro-optic device comprising an electro-optic crystal substrate, an optical waveguide path in the crystal adjacent the substrate surface and at least two electrodes spaced from the surface by a buffer layer to control the refractive index of the path, the improvement wherein the buffer layer comprises a transparent electronically conductive material selected from the group consisting of gallium-indium-oxide and zinc-indium-tin-oxide and said buffer layer is removed in a region between the two electrodes.

* * * * *